(12) United States Patent
Zubrod

(10) Patent No.: US 9,944,560 B2
(45) Date of Patent: *Apr. 17, 2018

(54) FIRE RESISTANT COATING

(71) Applicant: Geopolymer Solutions LLC, Coral Springs, FL (US)

(72) Inventor: Rodney Zubrod, The Woodlands, TX (US)

(73) Assignee: Geopolymer Solutions LLC, Coral Springs, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/615,439

(22) Filed: Jun. 6, 2017

(65) Prior Publication Data

US 2018/0037504 A1  Feb. 8, 2018

Related U.S. Application Data

(63) Continuation-in-part of application No. 15/228,829, filed on Aug. 4, 2016, now Pat. No. 9,670,096, and a continuation-in-part of application No. 15/474,074, filed on Mar. 30, 2017.

(51) Int. Cl.
| | |
|---|---|
| *C04B 28/00* | (2006.01) |
| *C04B 14/44* | (2006.01) |
| *C04B 14/04* | (2006.01) |
| *C04B 14/18* | (2006.01) |
| *C04B 14/20* | (2006.01) |
| *C04B 14/22* | (2006.01) |
| *C04B 22/00* | (2006.01) |
| *C04B 111/28* | (2006.01) |

(52) U.S. Cl.
CPC ............ *C04B 28/006* (2013.01); *C04B 14/04* (2013.01); *C04B 14/18* (2013.01); *C04B 14/202* (2013.01); *C04B 14/22* (2013.01); *C04B 14/44* (2013.01); *C04B 22/0013* (2013.01); *C04B 2111/28* (2013.01)

(58) Field of Classification Search
CPC ....... C04B 28/006; C04B 14/44; C04B 14/04; C04B 14/18; C04B 14/202; C04B 14/22; C04B 22/0013; C04B 2111/28
See application file for complete search history.

(56) References Cited

U.S. PATENT DOCUMENTS 9,670,096 B1 * 6/2017 Zubrod ................... C04B 28/08
9,725,365 B1 * 8/2017 Zubrod ................. C04B 28/021

OTHER PUBLICATIONS

H.A Abdel-Gawwad, Effect of Reactive Magnesium Oxide on Properties of Alkali Activated Slag Geopolymer Cement Pastes, The 2014 World Congress on Advances in Civil, Environmental, and Materials Research (ACEM14), Aug. 24-26, 2014, 21 pages, Busan, Korea.

Shweta Mane, H.S. Jadhav, Investigation of Geopolymer Mortar and Concrete Under High Temperature, International Journal of Emerging Technology and Advanced Engineering, Dec. 2012, 7 pages, vol. 2, Issue 12.

* cited by examiner

*Primary Examiner* — Anthony J Green
(74) *Attorney, Agent, or Firm* — The Concept Law Group, PA; Lance Johnson; Scott D. Smiley

(57) ABSTRACT

A density controlled cold fusion concrete cementitious spray applied fireproofing material including a mixture of water, one or more of silicon dioxide, expanded glass, vermiculite, bottom ash, perlite, expanded shale, expanded polystyrene, and sulfonated formaldehyde, or other lightweight aggregates of various diameter sizes ranging from about 0.025 mm to about 12.5 mm in diameter; anhydrous or hydrous sodium or potassium metasilicate; waste from steel production consisting of Granulated Ground Blast Furnace Slag (GGBFS); high calcium or low calcium waste from coal combustion (fly ash or bottom ash); sodium tetraborate, sodium citrate dihydrate, citric acid, or boric acid; and an alkali-resistant micro-fiber.

30 Claims, No Drawings

FIRE RESISTANT COATING

REFERENCE TO RELATED APPLICATIONS

This application is a continuation-in-part of U.S. Ser. No. 15/228,829, filed Aug. 4, 2016, now U.S. Pat. No. 9,670,096 granted Jun. 6, 2017, and application Ser. No. 15/474,074 filed on Mar. 30, 2017, now U.S. Pat. No. 9,725,365 granted Aug. 8, 2017, the contents of each of which are incorporated herein by reference in their entirety.

FIELD OF THE INVENTION

This invention relates to spray applied fireproofing materials and methods for their manufacture, for protecting steel, wood, concrete, and other construction and industrial materials that require protection from unexpected fire events. More particularly, the invention relates to spray applied fireproofing materials and methods for their manufacture, that significantly reduce the generation of carbon dioxide and other green-house gases during production, unlike Portland cement and typical geopolymer cements. Most particularly, this invention relates to an entirely novel approach of using a geopolymer type of cement spray applied fireproofing material for strength, bonding, and heat resistance, respectively, which demonstrates dynamic characteristics which provide for elevated resistance to heat, elevated compressive strength, elevated bond strength, and elevated corrosion protection on steel features upon which it is placed.

BACKGROUND OF THE INVENTION

Cementitious spray applied fireproofing is not a new concept. For example, it is well known to spray apply fireproofing slurries to metal structural members and other building surfaces in order to provide a heat resistant coating thereon. U.S. Pat. Nos. 3,719,513 and 3,839,059, which are incorporated herein by reference, disclosed gypsum-based formulations that contain, in addition to the gypsum binder, a lightweight inorganic aggregate such as vermiculite, a fibrous substance such as cellulose, and an air entraining agent.

Geopolymer types of concrete include "alkali-activated fly ash geopolymer" and "slag-based geopolymer cement." (There is often confusion between the meanings of the terms 'geopolymer cement' and 'geopolymer concrete'. A cement is a binder, whereas concrete is the composite material resulting from the mixing and hardening of cement with water (or an alkaline solution in the case of geopolymer cement), and aggregates dispersed in the binder.)

Fly ash, also known as "pulverized fuel ash" in the United Kingdom, is a coal combustion product of fine particles that are driven out of the boiler with the flue gases. Ash that falls in the bottom of the boiler is called bottom ash. In modern coal-fired power plants, fly ash is generally captured by electrostatic precipitators or other particle filtration equipment before the flue gases reach the chimneys. Depending upon the source and makeup of the coal being burned, the components of fly ash vary considerably, but all fly ash includes substantial amounts of silicon dioxide ($SiO_2$) (both amorphous and crystalline), aluminum oxide ($Al_2O_3$) and calcium oxide (CaO), the main mineral compounds in coal-bearing rock strata. In the past, fly ash was generally released into the atmosphere, but air pollution control standards now require that it be captured prior to release by fitting pollution control equipment. In the US, fly ash is generally stored at coal power plants or placed in landfills. About 43% is recycled, often used as a pozzolan to produce hydraulic cement or hydraulic plaster and a replacement or partial replacement for Portland cement in concrete production. Pozzolans ensure the setting of concrete and plaster and provide concrete with more protection from wet conditions and chemical attack.

The burning of harder, older anthracite and bituminous coal typically produces Class F fly ash. This fly ash is pozzolanic in nature, and contains less than 7% lime (CaO). Possessing pozzolanic properties, the glassy silica and alumina of Class F fly ash requires a cementing agent, such as Portland cement, quicklime, or hydrated lime—mixed with water to react and produce cementitious compounds. Alternatively, adding a chemical activator such as sodium silicate (water glass) to a Class F ash can form a geopolymer. Notably, geopolymer cements rely on such minimally processed natural materials or industrial byproducts to significantly reduce its carbon footprint, while also being very resistant to many common concrete durability issues.

Fly ash produced from the burning of younger lignite or sub-bituminous coal, in addition to having pozzolanic properties, also has some self-cementing properties. In the presence of water, Class C fly ash hardens and gets stronger over time. Class C fly ash generally contains more than 20% lime (CaO), and unlike Class F, self-cementing Class C fly ash does not require an activator. Alkali and sulfate ($SO_4$) contents are generally higher in Class C fly ashes.

The slag-based geopolymer cement often uses a granulated, ground, blast furnace slag (GGBFS) which is obtained by quenching molten iron slag (a by-product of iron and steel-making) from a blast furnace in water or steam, to produce a glassy, granular product that is then dried and ground into a fine powder.

Recycling fly ash and GGBFS materials have become increasing popular in recent years due to increasing landfill costs, interest in sustainable development, and reduced carbon footprint for buildings.

The use of geopolymer types of cement and concrete formulations in spray-applied fireproofing is relatively new. Geopolymer types of cement have a heat resistance that is typically relatively high when compared to Portland cement, but there are challenges in using this material as a fireproof coating.

WO 2015/144796A1 discloses a fireproofing cementitious coating composition containing organic polymers and blast furnace slag. The invention provides a composition having a bulk density of 0.8 g/cm3 or less comprising (a) 25-65 weight % of an inorganic binder comprising (i) 83 to 100 weight % of calcium aluminate cement, (ii) 0 to 14 weight % of calcium sulphate, (iii) 0 to 9 weight % of Portland cement wherein the weight % of (i), (ii), (iii) is based on the sum of (i)+(ii)+(iii), (b) 0.5-15 weight % of one or more organic polymers, (c) 30-75 weight % of one or more inorganic fillers wherein the bulk density of the fillers is less than 0.5 g/cm3, wherein weight % is calculated on the total weight of all the non-volatile components in the composition.

U.S. Pat. No. 5,718,759 discloses a fire-stopping cementitious material made from pozzolanic aggregate and a blend of Portland cement and ground blast slag (Column 1, Lines 15-20; Column 1, Lines 58-67; Column 2, Lines 57-65; Column 6, Lines 5-24). A cementitious composition is disclosed which is useful for water-resistant construction materials, including floor underlayments, backing boards, self-leveling floor materials, road patching materials, fiberboard, fire-proofing sprays, and fire-stopping materials includes about 20 wt. % to about 75 wt. % calcium sulfate beta-hemihydrate, about 10 wt. % to about 50 wt. % Portland cement, about 4 wt. % to about 20 wt. % silica fume and about 1 wt. % to about 50 wt. % pozzolanic aggregate. The Portland cement component may also be a blend of Portland cement with fly ash and/or ground blast slag.

U.S. Pat. No. 8,519,016 discloses a lightweight cementitious binder composition containing fly ash, alkali metal salt of citric acid, alkali metal silicate, foaming agent for entraining air, and water (Column 3, Lines 46-62; Column 4, Lines 20-25; Column 4, Lines 60-67; Column 8, Lines 1-5). The invention is directed toward a method of making a lightweight cementitious binder composition with improved compressive strength for products such as cementitious panels. The method mixes fly ash, alkali metal salt of citric acid, alkali metal silicate, foaming agent for entraining air, water and in the preferred embodiment a foam stabilizing agent. Compositions which include fly ash selected from the group consisting of class C fly ash, class F fly ash and mixtures thereof, alkali metal salts of citric acid, alkali metal silicates, foaming agents, and preferably a foam stabilizer, such as polyvinyl alcohol, and do not require use of set retarders. Compositions containing class F fly ash can optionally contain Type III Portland cement.

U.S. Pat. No. 8,167,998 discloses a lightweight ready-mix concrete composition containing coarse aggregate combination such as ground granulated blast furnace slag, fly ash, glass, silica, expanded shale, perlite, and/or vermiculite, as well as set retarders such as borates. In its broadest context, the patent discloses a lightweight ready-mix concrete composition that contains 8-20 volume percent cement, 11-50 volume percent sand, 10-31 volume percent prepuff particles, 9-40 volume percent coarse aggregate, and 10-22 volume percent water, where the sum of components used does not exceed 100 volume percent. The prepuff particles have an average particle diameter of from 0.2 mm to 8 mm, a bulk density of from 0.02 g/cc to 0.64 g/cc, an aspect ratio of from 1 to 3. The slump value of the composition measured according to ASTM C 143 is from 2 to 8 inches. After the lightweight ready-mix concrete composition is set for 28 days, it has a compressive strength of at least 1400 psi as tested according to ASTM C39.

WO 2016/016385A1 discloses a geopolymer used as a binder for fire resistant insulating material (Page 1, Lines 3-7; Page 6, Lines 2-9; Page 7, Lines 30-33; Page 8, Lines 5-15). The reference illustrates use of a geopolymer in a coating composition for a building construction component, a coated component for use in building construction wherein the coating comprises a geopolymer, a method of coating a component comprising applying a curable geopolymer mixture to a surface of the component and curing the mixture to form a cured geopolymer coating, and the use of a geopolymer as a mortar.

U.S. Patent Publication No. 2014/0047999 discloses an acid and high temperature resistant cement composite containing fly ash and ground slag. The patent is largely directed toward a process for the production of acid and high temperature resistant cement composites, where the matrix is alkali activated F fly ash alone, F Fly ash combined with ground slag or ground slag alone. F-fly ash produces lower quality alkali activated cement systems. On the other hand, the lack of calcium oxide results in very high resistance to medium and highly concentrated inorganic or organic acids. The high strength and low permeability of pure F-fly ash cement systems is achieved by using in the composition un-densified silica fume, the amorphous silicon dioxide obtained as by products in production of ferro-silicones. Precipitated nano-particle silica made from soluble silicates and nano-particle silica fume produced by burning silicon tetra chloride in the hydrogen stream.

U.S. Patent Publication No. 2015/0321954 discloses a geopolymer cement containing fly ash and granulated blast furnace slag. The patent discloses a solid component activator for use in a geopolymer cement containing a silico-aluminate material comprising a mixture of sodium silicate and sodium carbonate for activating the geopolymer cement by increasing reactivity of the silico-aluminate material in the geopolymer cement when forming geopolymer concrete.

EP 0807614B1 discloses a spraying concrete containing calcium aluminate glass, aluminum silicate, and pozzolanic material.

Additional problems exist with previous fireproofing treatments. For example, architects have many specifications for building structures and the components that make up their hidden and exposed infrastructures. Such specifications can also include the equilibrium density of any applied fireproof coating. Typical specifications are 15, 20, 25, 40 and 50 pounds per cubic foot.

An applied fireproof coating is preferably done by spraying with conventional spraying equipment although coating repairs may be done with a higher viscosity material and a trowel. The applied coating should also exhibit good rheological strength, cure fully and without substantial shrinkage, and exhibit good bond strength to the applied substrate.

Two types of standard tests are used to measure fire resistance of applied coatings on a metal substrate. Both measure the time required for the protected substrate to reach 1000° F. This time is generally understood the time provided to allow occupants of the protected structure to escape. Thus, a longer time means a longer period for evacuating the structure.

The first test is found in ANSI/UL263 "Fire Tests of Building Construction Materials." (The ANSI/UL263 test is equivalent to ASTME119.) This test applies an increasing level of heat up to 2000° F. over a designated period of time. The second test is ANSI/UL1709 "Rapid Rise Fire Tests of Protection Materials for Structural Steel" that applies the 2000° F. heat over 5 minutes. The ANSI/UL1709 test is generally considered to be the more severe test.

It would be desirable to have an effective geopolymer coating that could be applied by spraying, troweling or similar techniques that can apply an effective fire-resistive coating to a building infrastructure.

It would also be desirable to have fire resistant geopolymer coating that exhibited good rheological strength, bond strength, and good durability.

It would also be desirable to have a geopolymer coating that could be adjusted to a specified equilibrium density upon curing to meet various building specifications and that would exhibit good fire-resistance times with the applicable testing standards.

SUMMARY OF THE INVENTION

The present invention is directed towards materials and methods for producing a density controlled cold fusion concrete cementitious spray applied fireproofing for use in the construction and maintenance industries for protecting steel, wood, concrete, and other construction and industrial materials that require protection from unexpected fire events.

One purpose for developing the product of the present invention was to provide a formulation which significantly reduces the generation of carbon dioxide and other greenhouse gases during production, unlike Portland cement and typical geopolymer cements or concretes.

Another purpose for developing the present invention was to provide an effective geopolymer coating that can provide an effective fire-resistive coating to a building infrastructure.

A further purpose was to provide a fire resistant geopolymer coating that exhibits good rheological strength, bond strength, and good durability.

A further purpose for developing the present invention was to a geopolymer coating that could be adjusted to a specified equilibrium density upon curing to meet various building specifications and that would exhibit good fire-resistance times with the applicable testing standards.

A further purpose is to increase the quality of the product by reducing damage to constructed features from, for example, exposures to climatic conditions (such as extreme or variable weather), extreme heat, damaging chemicals such as chlorides, sulfates, acids, or the like, or impact damage to the spray applied fireproofing from shipping or construction efforts.

An additional purpose for the materials and methods disclosed herein is to provide industries, such as the construction industry, with a product that significantly reduces the generation of carbon dioxide and other green-house gases during production, unlike Portland Cement and typical geopolymer cements. Further, another advantage of the invention is that it utilizes basic processes and materials that may be incorporated into existing production facilities and methodologies.

In accordance with the purposes and objectives noted above and that will become apparent from the description herein, geopolymer coatings of the invention and a process of protecting at least a portion of a building with said composition are based on the application to the building of a fire resistant material that comprises a mixture of:

(a) 15-50 wt % of at least one lightweight aggregate having a bulk specific gravity of less than 1.0 and a diameter ranging from about 0.025 mm to about 12.5 mm;

(b) 5-60 wt % of at least one alkali-activated, cementitious material;

(c) 2-15 wt % of at least one activator for said alkali-activated, cementitious material;

(d) 0-15 wt % of at least one set-time retardant;

(e) 0.05-5 wt % of at least one protein material or synthetic protein material;

(f) 0.01-5 wt % of at least one alkali-resistant fiber;

(g) 0-2 wt % of magnesium oxide;

(h) 0-4 wt % of a water reducer;

(i) 0-4 wt % of a protein;

(j) 0-4 wt % of a rheology enhancer; and (k) water.

With respect to GGBFS and fly ash, either one may be used without the other, or, the materials can be combined as a portion of the cementitious material.

In some cases, where unit weight and volume change efforts are extra-ordinarily problematic, a protein or synthetic protein material achieving the same characteristics as protein that is able to form a weak covalent bond with the hydroxides and silicates, therein altering the ion concentration of the hydroxides and silicates for the purpose of retaining water, maintaining a consistent volume during the curing process, and to reduce the sticky/tacky characteristic of silicates is utilized. Concentrations of the protein may vary from between about 0.05% (wt/wt) and about 2.5% (wt/wt) of the cementitious mass.

Other objects and advantages of this invention will become apparent from the following description taken in conjunction with any accompanying drawings wherein are set forth, by way of illustration and example, certain embodiments of this invention. Any drawings contained herein constitute a part of this specification and include exemplary embodiments of the present invention and illustrate various objects and features thereof.

DETAILED DESCRIPTION OF THE INVENTION

Geopolymer coatings of the invention exhibit a viscosity suitable for spray application and comprise a fire resistant mixture that contains a mixture of ingredients that form a fire resistant coating that exhibits the ability to apply a coating of a predetermined equilibrium density with little or no shrinkage, good compressive strength, and superior bond strength. Such coatings are environmentally sensitive and have widespread application in residential, commercial, and multi-dwelling structures.

Unless otherwise indicated, all material requirements are expressed as wt/wt %, understood to be the mass of a particular constituent over the mass of the entire mixture, as indicated, inclusive of water×100%.

The present invention is directed to a density—controlled, concrete, cementitious, fireproofing material that can be applied with conventional spraying equipment for fire resistant coatings to achieve a desired, predetermined, equilibrium density. The product of the instant invention is useful for protecting steel, wood, concrete, and other construction and industrial materials that require protection from unexpected fire events.

A unique challenge in developing the formulation was to overcome geopolymer degradation and fluxing at exposure temperatures of around 1,000 to 1,200 degrees Fahrenheit. This was accomplished by designing a sacrificial and light-weight particle system that dissipated temperatures during 1, 2, 3, and 4-hour exposures to 2,000 degrees Fahrenheit, without experiencing a temperature of greater than 999 degrees Fahrenheit to underlying steel during the exposure period, and less temperature with greater thicknesses to less durable substrates such as wood and concrete.

Another unique challenge was balancing mixture constituents to achieve a consistent, predetermined, constructed design equilibrium density within the range from about 15 pounds per cubic foot (pcf) to about 60 pcf, with specific targeted densities of 15 pcf, 25 pcf, 40 pcf, and 50 pcf, while maintaining relative compressive strengths within the range of 200-3000 psi, preferably compressive strengths of about 200 psi, 750 psi, 1,800 psi, and 3,000 psi for durability purposes.

These challenges were overcome by utilizing variable sizes and types of lightweight aggregates, decreasing the mixture's cohesive (wet) shear strength rheology thereby reducing pump pressure, and incorporating an entrapped and entrained air structure.

Formulations according to the present invention utilize glassy activators that mobilize other glassy materials and sacrificially polymerize these materials into various forms of glass and metallic oxides, hydroxides, and hydrates under the effects of high heat. This polymerization reduces the mass loss during material equilibrium unit weight determinations. Mass loss during heating is typically exacerbated when lightweight particle have absorbed liquids during the mixing and application processes. Applying the formulation under the pressures typical in a commercial sprayer can also artificially compact the formulation to exhibit a higher apparent density.

Analysis of the test results and temperature dissipation system of the present invention at 2,000° F. clearly identifies that temperature dissipation at greater and less than 2,000° F. occurs with variable relative system thicknesses applicable for other temperatures. The 2,000° F. test temperature was chosen based upon current standard industry practice as prescribed by the American Society for Testing and Materials (ASTM), and Underwriter Laboratories (UL) as reflected by the protocols of UL 263 (ASTM E119) and UL 1709.

While all of the measures utilized to overcome the challenges are applicable, one or more of the measures are selected based upon the field application, the pump utilized, and the application method in the event no pump is utilized.

It is noted that spray applied or trowel applied fireproofing materials that, when burning during a fire event and where the consumed material may be exposed to humans, must not produce deleterious smoke. As such, when the consumed material may be exposed to humans, constituent materials and the balance of such utilized in the processed mixtures that produce toxic smoke when subject to temperatures in excess of 1,999° F. should not be used.

The specific materials used in the present invention are chosen largely based upon cost, pump-ability, effectiveness in controlling unit weight, and water absorption. With regard to water absorption, the materials used in the present invention are largely different than other spray-applied fireproofing products in that the present invention does not use any Portland cement in the mixture. In Portland-containing mixtures, water becomes absorbed in the mixture and is then lost almost entirely as the material dries to its equilibrium density. This loss of weight makes it difficult to provide formulations that will consistently achieve a desired, target, equilibrium density of the applied coating.

When water is added to the present composition, the water mixes with and activates the sodium metasilicate, sodium tetraborate and other soluble materials. These materials then polymerize and bind the water into a form that does not entirely evaporate during the drying phase. As such, any water that enters the pores of any absorptive materials stays in the lightweight absorptive materials and only increases the density of the lightweight particle. By using low water absorption materials, the resulting mixture is more stable in its density and allows better control of the final coating.

The water should be potable to provide a greater degree of consistency in properties and behaviors of the resulting formulation. For example, the constituent balancing with varied types of water supply would have to account for varying pH, mineral content, fluoride, and other chemicals and ingredients.

The amount of water used in the present formulation should be determined by routine batch tests to achieve the desired density, strength, and viscosity characteristics for spray application with a pressure pump. Water is generally added to the mixture in mass amounts ranging from about 10% (wt/wt) to about 65% (wt/wt), preferably an amount within the range of 10-50 wt %, such that the concentration of water is effective to produce slump consistencies and other characteristics that comply with project requirements for the intended purpose ranging from a trowel applied vertical or overhead repair or coating, to spray applied coating materials for various structural items including metal, concrete, and wood.

The Aggregates

The aggregates should comprise or consist of lightweight aggregates having as low a specific gravity as is possible, but normally not greater than 1.0, preferably less than or equal to about 0.60, and even more preferably less than or equal to about 0.40. Importantly, the aggregates chosen should not produce toxic smoke when exposed to temperatures in excess of 1,999° F. Suitable lightweight filler materials may include vermiculite, volcanic cinders, bauxite, other vesicular volcanic minerals, expanded glass, glass bubbles, aluminum bubbles, expanded shale, cenospheres that may be manmade and or a coal combustion by-product, synthetic or protein air voids, expanded polystyrene, cotton, and other manmade or naturally occurring and void creating materials. Low absorptive aggregates such as a coated expanded glass have lower liquid absorption properties and are preferred.

Vermiculite is highly absorptive of water, but relatively high concentrations of vermiculite can be used to control density. Vermiculite is also easy to pump.

Expanded polystyrene has low absorptive characteristics and enhances pumping greatly. It's also somewhat flammable so lower concentrations are used to retain good fire resistivity. When expanded polystyrene burns, it creates carbon dioxide and water vapor that somewhat insulates the layer but it also begins to degrade at around 180° F. to 240° F. (82°-116° C.) so smaller particles sizes and low concentrations of expended polystyrene are preferably used so the voids left from the degradation during temperature exposure are small and lesser in volume.

Perlite has a lower water absorptivity than vermiculite and is a great insulator. Higher density perlite is a harder particle, but harder to pump so the concentration of this material should be balanced with the amount of vermiculite and expanded polystyrene to reduce wear and tear on the pumping equipment. Preferably, the lowest density perlite is used to reduce pump pressure and better control the unit weight of the mixture.

Expanded glass in the present mixture has low insulating properties and is preferably coated to reduce absorptivity. Expanded glass, however, is somewhat abrasive and increases pumping pressures so its concentration in any mixture should be balanced against these effects contributed by other materials in the mixture.

For pumping purposes, using a minimum of 2 different sizes of aggregate are advantageous to reduce the packing properties of gap-graded materials during pumping. Rounded particles are advantageous and in most cases, a stable cenosphere resulting from coal combustion or ceramic, aluminum, or glass manmade cenospheres are preferred.

The combined aggregate is preferably present, in terms of mass, in an amount from about 15% (wt/wt) to about 50% (wt/wt) of the final mixture mass including water. The combined aggregate individual and overall concentration should be adjusted and balanced to achieve suitable pumping characteristics in the case of pneumatic applications, strength, and unit weight density. The volume of aggregate and cementitious materials is balanced to achieve the unit weight density specified for the project, which may vary from about 15 pcf to about 50 pcf.

The specific amount of aggregate used in the present formulation should be determined by routine trial batch tests that are targeted at obtaining the desired density, strength, and pumping viscosity. For projects that use a pneumatic projection spray, the maximum size of aggregate should be selected based upon the equipment intended. A maximum nominal aggregate size of about 5 mm is generally effective. When pumping with rotor-stator pumps, a high vermiculite concentration is desirable. When pumping with squeeze or piston type pumps, expanded polystyrene is helpful in concentrations ranging from about 2.5 to 15-percent, particularly when pumping up to high elevations.

Cementitious Materials

Cementitious materials should be combined with the dry aggregate materials prior to bagging or other packaging. The cementitious materials preferably include at least one of fly ash (Class C or Class F) and Granulated Ground Blast Furnace Slag (GGBFS). Both GGBFS and fly ash materials are the product and waste from burning industrial materials at high temperatures and accordingly, both materials have a relative high resistance to heat which make them excellent components for a heat resistant coating.

The fly ash and Granulated Ground Blast Furnace Slag (GGBFS) are preferably added in a concentration sufficient to produce the desired mixture strength, volume change, carbonation, and rheological behavior. Suitable concentrations are at concentrations ranging up to about 70% (wt/wt), preferably up to about 60 wt %, even more preferably within a range from about 5-50 wt %, and especially within the range of 15-50 wt %. The fly ash and GGBFS concentrations of the mixture should be selected by balancing fly ash and/or GGBFS mass and volume amounts in mixture designs until characteristics are as specified by project requirements.

Should the addition of desirable amounts of GGBFS or fly ash not achieve the intended compressive strength, calcium hydroxide may be added in an amount within the range from about 1% (wt/wt) to about 10% (wt/wt) to increase strength. Typically and preferably, the overall range falls within a range from about 5% (wt/wt) to about 70% (wt/wt). The amount of either or both materials is dependent upon inherent characteristics including the calcium content, the aluminum content, the carbon content (loss on ignition), and the silicon content.

Using a mixture of two or three cementitious materials is advantageous for production purposes in order to reduce the variability effects of one of the materials (if variable properties are an issue for the selected source of such materials).

Naturally occurring pozzolan materials such as kaolin clay, attapulgite clay, and other natural or manmade minerals can be utilized. These clay materials preferably have a silicon/sodium dioxide content above about 40% and do not produce toxic smoke when exposed to temperatures above 1,999° F. Routine testing will be used to determine the optimum concentration of each material, but a total cementitious amount of between 100 (for low density) and 800 (for high density) pounds per cubic yard, preferably 100-700 lb/yd$^3$ is effective.

The fly ash and GGBFS are pozzolans and cementitious materials that allow the formulation to avoid the use of Portland cement. The fly ash and GGBFS materials are activated by the alkali salt. Either one or the other, or both are used in the formulations according to the present invention. The GGBFS is desirable as a strength enhancer due to an elevated calcium hydroxide content because calcium hydroxide is very active. The fly ash also contains some calcium hydroxide but around 30 to 50% of that found in the GGBFS, and it's not as effective to add strength to the formulation. The specific amounts of these materials that are used in a final formulation are determined with routine batch trials to obtain the best strength and unit weight for the target equilibrium density.

The Activators for the Cementitious Materials

The cementitious material activators preferably include sodium or potassium metasilicate, or sodium or potassium metasilicate pentahydrate. The precise amount of how much of each is added depends upon the desired mixture strength, volume change, carbonation, and rheological behavior. Suitable amounts are generally within a range from about 2% (wt/wt) to about 25% (wt/wt), preferably 4-20 wt % based on the final mixture. The concentration of sodium or potassium metasilicate or pentahydrate in the mixture should be selected by balancing the mass and volume amounts in mixture designs until characteristics comply with project requirements. During events where mixing times are very short such as continuous mixing and pumping for spray applications, elevating the pentahydrate content is often times beneficial to ensure complete incorporation of silicate materials, or, reducing the particle size of the pentahydrate or metasilicate allows for faster reactions with water. The amount of sodium or potassium metasilicate or pentahydrate is reduced when Portland or other cements are utilized.

In events where the application is in an industrial area subject to an airborne acidic particulate, higher concentrations of metasilicate are desired to increase the layers of silicon, sodium dioxide, or potassium dioxide content and relative resistance to acid attack. In industrial applications subject to acids, the mixture will be resistant to all low acid concentrations except for hydrofluoric acid. Increasing the metasilicate content will inherently increase equilibrium unit weight and therefore, balancing of lightweight or voiding materials must be accomplished. In events where the application is subject to moderate or extreme climatic (temperature) and precipitation events, the metasilicate content is typically maintained above 7-percent to achieve sufficient strength to resist these effects.

Sodium metasilicate is an alkali salt. The sodium metasilicate activates the pozzolan components in the fly ash and GGBFS to reduce permeability and to increase strength. Sodium metasilicate carries the largest responsibility for increasing absorptive aggregate weight so its concentration must be balanced effectively against the inherent absorptivity of the aggregates used in the mixture.

Set-Time Retardants

The set-time retarding materials should be selected based upon the effectiveness of the material in the constituent combination utilized. Generally, if 1-hour of set time is achieved using the most economical material and relative concentration, this is satisfactory to allow finishing of the layer should it be required.

Suitable set-time retardants include sodium tetraborate, sodium citrate dihydrate, citric acid, boric acid, and silicic acid. Set-time retardants are generally added to formulations according to the invention are added in an amount within the range from about 0 to about 15.0% (wt/wt) by mass of the mixture including water, to extend the time of set and/or working time.

Sodium tetraborate is a preferred set-time retarder and a corrosion inhibitor for steel structures. Set-time retardants such as sodium tetraborate allow the geopolymer mixture of the invention to gain strength at a rate sufficient to maintain cohesion while allowing the applicators to finish the applied layer. The specific amount of sodium tetraborate is determined by routine testing but is generally added in an amount within the range of about 40 to 60% by weight of the metasilicate.

Anti-Cracking Agents

Micro fibers are an important ingredient to reduce cracking of the finished layer as a result of evaporation and autogenous volume change from material polymerization. Any micro fiber can be selected but the fiber should not produce toxic smoke when subject to temperatures above 1,999° F. Suitable fibers for crack control in the formulation of the invention include alkali resistant glass fibers, ceramic fibers, or basalt fibers due to their lower water demand, high heat resistance, and decrease of cohesive mixture shear strength. Routine tests will determine the specific concentration of fibers for optimum effect but an amount within the range of 0.01-5 wt % is generally effective. A variety of fiber lengths can be used. Suitable fiber lengths within the range from about 3 mm to about 20 mm, preferably 4-10 mm, and even more preferably within the range of 5-8 mm.

Additional Agents

Additional materials utilized to control volume change and increase strength include water reduction and expansion agents. Various industry water reducers and shrinkage compensators are available for Portland mixtures that are effective in geopolymer types of fireproofing and fire resistant mixtures. For example, a sulfonated formaldehyde is effective to reduce water demand. Sulfonated formaldehyde is added as a portion of the cementitious material in concentrations ranging from about 0.001% (wt/wt) to about 0.5% (wt/wt), preferably in an amount within the range from about 0.001-0.01 wt %, and more preferably in an amount within the range of 0.0015-0.004 wt % based on the overall mixture. Only enough sulfonated formaldehyde should be used to reduce water demand to its maximum. Adding more sulfonated formaldehyde beyond that point is unnecessary. Formaldehyde is a toxic chemical and accordingly, concentrations should be limited to below maximum threshold limits.

The use of sand, silicates, aluminosilicates, aluminosilicate clays, and other inert and active materials also produce a water-reducing effect.

Magnesium oxide is added to control overall shrinkage. It is actually an expansion agent but if the added concentration is kept sufficiently low (e.g., within a range from about 0.0001-0.5 wt %, preferably 0.0007 to about 0.03 wt %), it effectively counteracts shrinkage the applied material might otherwise exhibit. The most preferred concentration is about 0.0015 wt % of the overall mixture. Magnesium Oxide should be added only to the extent that volume change or expansion is adjusted to optimal values. Adding too much magnesium oxide can be deleterious from the addition of excessive expansion to the final formulation that overbalances other sources of shrinkage. Adding the right amount of magnesium oxide or hydroxide imparts a positive volume change that just offsets the shrinkage of other components in the applied mixture.

Thixotropic properties are advantageous during spray applied applications. In these events, water contents are many times increased to reduce pump pressures, and to reduce equilibrium densities. Adding very fine, high temperature resistant materials, such as, but not limited to, silica fume, fumed silica, purified attapulgite clay, and other thixotropic materials are helpful to increase the stability of the applied layer and to reduce sagging of the wet, applied, layer while maintaining or increasing strength. Such very fine materials also help to fill voids in the cured mixture and thereby help to increase the strength of the final coating.

The formulations of the present invention can be adjusted to meet a variety of target densities after application to a protected structure. The design methodologies relative to achieving a desired mixture volume and equilibrium unit weight will vary. When pumps are not utilized for conveyance or application purposes, standard design calculations including determining volume and unit weight based upon reported/tested specific gravity can be performed. When pumps are utilized for conveyance or application purposes, liquids will be imposed into the absorptive aggregates as a result of pumping pressure. The liquid, or a portion of it, will contain water and sodium or potassium silicate materials that will not wholly volatize; the remaining non-volatized material will increase the specific gravity/unit weight of the materials and must be compensated for in the form of reducing the unit weight due to the increased specific gravity. Methods of compensating for the increased specific gravity include balancing absorptive aggregates, increasing the lower absorptive aggregate concentration, or, installing an air-voiding mechanism such as air entrainment or controlled low strength material additive such as that supplied by Fritz, BASF, W.R. Grace, Euclid, or SIKA at concentrations determined by trial batch tests.

In some cases, where unit weight and volume change efforts are extra-ordinarily problematic, a protein can be added. Such proteins include synthetic protein materials that are capable of forming a weak covalent bond with the hydroxides and silicates in the mixtures. These covalent bonds alter the ion concentration of hydroxides and silicates that might retain water. By this action, it is believed that the added proteinaceous material helps the mixture to maintain a consistent volume during the curing process and reduce the sticky/tacky characteristic of the silicates. Concentrations of the protein may vary from between about 0.05% (wt/wt) and about 5.0% (wt/wt) of the mass of all ingredients.

The protein component useful in the present invention as a tackiness reducer includes large biomolecules, or macromolecules, inclusive of one or more long chains of amino acid residues. A preferred protein is based on casein as well as its sodium and potassium salts. See generally US Pat. Nos. 619,040 and 1,537,939, the contents of which are hereby incorporated by reference. Protein is added as a portion of the cementitious material in concentrations ranging from about 0.05% (wt/wt) to about 5% (wt/wt), with the proviso that protein is provided at the minimum concentration which will produce a covalent bond between mixture silicates and produced hydroxides therein temporarily removing the mixture sticky/tacky characteristic and reducing mixture volume change.

When all constituents are combined, the material should be mixed for a period of time within the range from about 10 seconds to 4 minutes. A mixing time within the range of 30-60 seconds is often is sufficient for the most common viscosities used with conventional spray equipment. The mixture constituents used in the present invention are varied and balanced to achieve wet and dry equilibrium mixture densities as required by project specifications, and ranging from about 15 pcf to 90 pcf, preferably 15-50 pcf dry equilibrium density and a compressive strength varying from about 100 to 5,000 psi, preferably 200-3000 psi. Mixture constituents are preferably varied to ensure that no plastic, drying, or autogenous shrinkage cracking occurs, and further varied to accommodate variable pump types and pumping elevation differentials In order to produce an aggregate, void, and cementitious material that can be trowel applied, or pneumatically projected into place that is resistant to climate variability, water, acids, sulfates, chlorides, and heat exposure up to and exceeding 4 hours at a temperature of 2,000 degrees Fahrenheit (UL heat curve as defined by the ANSI/UL263 (ASTM E119) procedure), dry materials should be combined, water added, and mixing should progress for as long a period as is possible, but preferably for a time within the range of a minimum of 10 seconds to about 5 minutes, preferably 30-120 seconds in the case of continuous mixing and pumping apparatus, and for a time of 30 seconds to 4 minutes, preferably a minimum of 60 seconds to about 3 minutes when using non-continuous batching apparatus.

After placement, curing in any convenient ambient environment may occur until specified strength is achieved, or the curing may be expedited by elevating the temperature around the material to from about 95° F. to about 180° F. Electrical curing can occur by adjusting the voltage and amperage to appropriate values and pulsing the electrical current through the concrete until desired strength is achieved.

The following tables describe the applicable ranges (wt %) of the various ingredients used for various formulations according to the invention.

TABLE 1

15 pcf Target Density (Air Applied; Vermiculite + EPS)

| Ingredient | Range (wt %) | Preferred (wt %) | Function |
|---|---|---|---|
| Sulfonated Formaldehyde | 0.05-0.5 | 0.06-0.1 | Water Reducer |
| Magnesium Oxide | 0.02-0.5 | 0.04-0.08 | Shrinkage Control |
| Size #3 Vermiculite | 10-50 | 10-20 | Lightweight Aggregate |
| Expanded Polystyrene | 0.01-5 | 0.3-1 | Lightweight Aggregate |
| GGBFS | 5-50 | 10-20 | Cementitious |
| Class F Fly Ash | 5-50 | 15-25 | Cementitious |
| Fine Sodium Metasilicate | 3-15 | 4-8 | Activator |
| Sodium Tetraborate | 1-7 | 1.5-4.5 | Water Reducer |
| 6 mm Basalt Micro Fibers | 0.01-5 | 0.1-1 | Crack Control |
| Fumed Silica | 0.01-5 | 0.08-0.4 | Rheology Enhancement |
| Protein | 0.01-5 | 0.05-0.4 | Curing Enhancement |

TABLE 2

15 PCF Target Density (Any Method; Vermiculite + EPS)

| Ingredient | Wt % | Preferred Wt % | Function |
|---|---|---|---|
| #3 Vermiculite | 5-50% | 10-25% | Lightweight Filler Aggregate |
| Expanded Polystyrene (EPS) | 0.01-5% | 0.2%-0.9% | Lightweight Filler Aggregate |
| GGBFS | 5-50% | 10-20% | Cementitious |
| Fly Ash | 5-50% | 10-25% | Cementitious |
| Sodium Tetraborate | 1-7% | 1-5% | Set Time retardant |
| Fine Sodium Metasilicate | 2-15% | 3-8% | Activator |
| Magnesium Oxide | 0.02-.5% | 0.04-0.1 | Shrinkage Reducer |
| Sulfonated Formaldehyde | 0.05-.5% | 0.05-0.1% | Water Reducer |
| Protein | 0.01-5% | 0.09-0.16% | Curing Enhancement |
| Fumed Silica | 0.01-5% | 0.14-0.23% | Rheology Enhancement |
| Basalt Micro Fibers | 0.01-5% | 0.1-0.7% | Crack Control |
| Water | 20-60% | 38-48% | Activator/Lubricant |

TABLE 3

15 PCF Target Density (Vermiculite + Perlite)

| Ingredient | Wt % | Preferred Wt % | Function |
|---|---|---|---|
| #3 Vermiculite | 5-50% | 10-18% | Lightweight Aggregate |
| Perlite | 1-20% | 2-7% | Lightweight Aggregate |
| GGBFS | 5-50% | 8-14% | Cementitious |
| Fly Ash | 5-50% | 11-16% | Cementitious |
| Calcium Hydroxide | 0-10% | 1-7% | Cementitious |
| Sodium Tetraborate | 1-7% | 1-3% | Set Time retardant |
| Fine Sodium Metasilicate | 3-15% | 2-7% | Activator |
| Magnesium Oxide | 0.02-0.5% | 0.02-0.1% | Shrinkage Reducer |
| Sulfonated Formaldehyde | 0.05-0.5% | 0.05-0.1% | Water Reducer |
| Protein | 0.01-5% | 0.09-0.2% | Curing Enhancement |
| Fumed Silica | 0.01-5% | 0.15-0.25% | Rheology Enhancement |
| 6 mm Glass Micro Fibers | 0.01-5% | 0.2-0.5% | Crack Control |
| Water | 20-60 | 38-48 | Activator/Lubricant |

TABLE 4

15 pcf Target Density (Sprayed; Vermiculite + Perlite)

| Ingredient | Range (wt %) | Preferred (wt %) | Function |
|---|---|---|---|
| Sulfonated Formaldehyde | 0.05-0.5 | 0.06-0.1 | Water Reducer |
| Magnesium Oxide | 0.02-0.5 | 0.04-0.08 | Shrinkage Reducer |
| Size #3 Vermiculite | 10-50 | 10-20 | Lightweight Aggregate |
| Perlite - 0.3 to 1 mm | 1-20 | 2-10 | Lightweight Aggregate |
| GGBFS | 5-50 | 7-15 | Cementitious |
| Class F Fly Ash | 5-50 | 10-25 | Cementitious |
| Fine Sodium Metasilicate | 3-15 | 3-10 | Activator |
| Sodium Tetraborate | 1-7 | 1-4 | Set Time retardant |
| 6 mm" Glass Micro Fibers | 0.01-5 | 0.3-1.2 | Crack Control |
| Fumed Silica | 0.01-5 | 0.1-0.25 | Rheology Enhancement |
| Protein | 0.01-5 | 0.09-0.2 | Curing Enhancement |
| Water | 20-60 | 35-50 | Activator/Lubricant |

TABLE 5

25 pcf Target Density (Vermiculite + Perlite + EPS)

| Ingredient | Wt % | Preferred Wt % | Function |
|---|---|---|---|
| #3 Vermiculite | 3-15 | 6-10 | Lightweight Filler Aggregate |
| Perlite, % | 1-20 | 5-10 | Lightweight Filler Aggregate |
| Expanded Polystyrene | 0.1-3 | 1-3 | Lightweight Filler Aggregate |
| GGBFS | 5-50 | 15-23 | Cementitious |
| Fly Ash | 5-50 | 22-30 | Cementitious |
| Sodium Metasilicate | 3-15 | 4-9 | Activator |
| Sodium Tetraborate | 1-7 | 2-5 | Set Time Retarder |
| Magnesium Oxide | 0.02-0.5 | 0.04-0.08 | Shrinkage Reducer |
| Sulfonated Formaldehyde | 0.05-0.5 | 0.05-0.1 | Water Reducer |
| Protein | 0.01-5 | 0.09-0.22 | Curing Enhancement |
| Fumed Silica | 0.01-5 | 0.2-0.3 | Rheology Enhancement |
| 6 mm Glass Micro Fibers | 0.01-5 | 0.03-0.25 | Crack Control |
| Water | 20-60 | 22-35 | Activator/Lubricant |

TABLE 6

40 pcf Target Density (Vermiculite + EPS)

| Ingredient | Wt % | Preferred Wt % | Function |
|---|---|---|---|
| #3 Vermiculite | 5-25% | 10-15% | Lightweight Filler Aggregate |
| Expanded Polystyrene | 0.2-5% | 2-4% | Lightweight Filler Aggregate |
| GGBFS | 5-50% | 12-20% | Cementitious |
| Fly Ash | 5-50% | 17-24% | Cementitious |
| Sodium Metasilicate | 3-15% | 4-7% | Activator |
| Sodium Tetraborate | 1-7% | 2-5% | Set Time retardant |
| Magnesium Oxide | 0.02-0.5% | 0.04-0.08% | Shrinkage Reducer |
| Sulfonated Formaldehyde | 0.05-.5% | 0.05-0.1% | Water Reducer |
| Protein | 0.01-5% | 0.13-0.18% | Curing Enhancement |
| Fumed Silica | 0.01-5% | 0.15-0.25% | Rheology Enhancement |
| 6 mm Glass Micro Fibers | 0.01-5% | 0.35-0.45% | Crack Control |
| Water | 15-70% | 30-40% | Activator/Lubricant |

TABLE 7

40 pcf Target Density (Vermiculite)

| Ingredient | Range (wt %) | Preferred (wt %) | Function |
|---|---|---|---|
| Sulfonated Formaldehyde | 0.05-0.5 | 0.06-0.1 | Water Reducer |
| Magnesium Oxide | 0.02-0.5 | 0.04-0.08 | Shrinkage Reducer |
| Size #3 Vermiculite | 5-25 | 8-18 | Lightweight Aggregate |
| GGBFS | 5-50 | 5-20 | Cementitious |
| Class F Fly Ash | 5-50 | 15-30 | Cementitious |
| Sodium Metasilicate | 3-15 | 4-8 | Activator |
| Sodium Tetraborate | 1-7 | 1.5-4 | Water Reducer |
| 6 mm" Glass Micro Fibers | 0.01-5 | 0.2-0.8 | Crack Control |
| Fumed Silica | 0.01-5 | 0.1-0.8 | Rheology Enhancement |
| Protein | 0.01-5 | 0.08-0.25 | Curing Enhancement |
| Water | 20-60 | 30-50 | Activator |

TABLE 8

40 pcf Target Density (Vermiculite + Ca(OH)$_2$)

| Ingredient | Wt % | Preferred Wt % | Function |
|---|---|---|---|
| #3 Vermiculite | 5-25% | 10-15% | Lightweight Aggregate |
| GGBFS | 0-50% | 10-16% | Cementitious |
| Fly Ash | 0-50% | 15-22% | Cementitious |
| Calcium Hydroxide | 0.1-10% | 1-3% | Cementitious |
| Sodium Metasilicate | 3-15% | 4-7% | Activator |
| Sodium Tetraborate | 1-7% | 1-5% | Set Time retardant |
| Magnesium Oxide | 0.02-0.5% | 0.04-.08% | Shrinkage Reducer |
| Sulfonated Formaldehyde | 0.05-0.5% | 0.05-0.1% | Water Reducer |
| Protein | 0.01-5% | 0.12-0.18% | Curing Enhancement |
| Fumed Silica | 0.01-5% | 0.15-0.25% | Rheology Enhancement |
| 6 mm Glass Micro Fibers | 0.01-5% | 0.3-0.5% | Crack Control |
| Water | 20-60% | 38-48% | Activator/Lubricant |

TABLE 9

50 pcf Target Density (Vermiculite + EPS)

| Ingredient | Range (wt %) | Preferred (wt %) | Function |
|---|---|---|---|
| Perlite 1-2 mm | 3-8 | 5-6 | Lightweight Aggregate |
| Expanded Polystyrene | 0.10-3 | 1-2.5 | Lightweight Aggregate |
| Sulfonated Formaldehyde | 0.05-0.5 | 0.05-0.1 | Water Reducer |
| Size #3 Vermiculite | 3-15 | 4-8 | Lightweight Aggregate |
| Magnesium Oxide | 0.02-0.5 | 0.04-0.1 | Shrinkage Reducer |
| GGBFS | 5-50 | 10-25 | Cementitious |
| Class F Fly Ash | 5-50 | 20-30 | Cementitious |
| Sodium Metasilicate | 3-15 | 5-10 | Activator |
| Sodium Tetraborate | 1-7 | 2-5.5 | Water Reducer |
| 6 mm" Glass Micro Fibers | 0.01-5 | 0.3-1 | Crack Control |
| Fumed Silica | 0.01-5 | 0.01-1 | Rheology Enhancement |
| Protein | 0.01-5 | 0.01-0.5 | Cure Enhancement |
| Water | 15-70 | 20-40 | Activator |

TABLE 10

50 pcf Target Density (Vermiculite + Perlite + EPS)

| Ingredient | Wt % | Preferred Wt % | Function |
|---|---|---|---|
| #3 Vermiculite | 3-15% | 4-8% | Lightweight Filler Aggregate |
| Perlite | 1-20% | 3-8% | Lightweight Filler Aggregate |
| Expanded Polystyrene | 0.1-3% | 1-3% | Lightweight Filler Aggregate |
| GGBFS | 5-50% | 15-23% | Cementitious |
| Fly Ash | 5-50% | 22-30% | Cementitious |
| Sodium Metasilicate | 3-15% | 4-8% | Activator |
| Sodium Tetraborate | 1-7% | 2-5% | Set Time retardant |
| Magnesium Oxide | 0.02-0.5% | 0.04-0.08% | Shrinkage Reducer |
| Sulfonated Formaldehyde | 0.05-0.5% | 0.05-0.1% | Water Reducer |
| Protein | 0.01-5% | 0.09-0.22% | Curing Enhancement |
| Fumed Silica | 0-5% | 0.2-0.3% | Rheology Enhancement |
| 6 mm Glass Micro Fibers | 0-5% | 0.03-0.25% | Crack Control |
| Water | 20-60 | 22-35 | Activator/Lubricant |

TABLE 11

50 pcf Target Density (Vermiculite + GGBFS)

| Ingredient | Wt % | Preferred Wt % | Function |
|---|---|---|---|
| #3 Vermiculite | 7-25% | 10-15% | Lightweight Filler Aggregate |
| GGBFS | 20-50% | 35-44% | Cementitious |
| Sodium Metasilicate | 1-15% | 4-8% | Activator |
| Magnesium Oxide | 0-2% | 0.04-0.08% | Shrinkage Reducer |
| Sodium Tetraborate | 1-7% | 2-5% | Set Time retardant |
| Sulfonated Formaldehyde | 0-4% | 0.05-0.1% | Water Reducer |
| Protein | 0-4% | 0.09-0.2% | Curing Enhancement |
| Fumed Silica | 0-4% | 0.15-0.25% | Rheology Enhancement |
| 6 mm Glass Micro Fibers | 0-4% | 0.2-0.5% | Crack Control |
| Water | 20-60% | 38-45% | Activator/Lubricant |

TABLE 12

50 pcf Target Density (Fly Ash)

| Ingredient | Wt % | Preferred Wt % | Function |
|---|---|---|---|
| #3 Vermiculite | 5-25% | 10-15% | Lightweight Filler Aggregate |
| Fly Ash | 0-50% | 32-45% | Cementitious |
| Calcium Hydroxide | 0-10% | 1-5% | Cementitious |
| Sodium Metasilicate | 1-15% | 4-8% | Activator |
| Sodium Tetraborate | 1-7% | 2-5% | Set Time Retardant |
| Magnesium Oxide | 0-2% | 0.04-0.08% | Shrinkage Reducer |
| Sulfonated Formaldehyde | 0-2% | 0.05-0.1% | Water Reducer |
| Protein | 0-2% | 0.09-0.2% | Curing Enhancement |
| Fumed Silica | 0-2% | 0.15-0.25% | Rheology Enhancement |
| 6 mm Glass Micro Fibers | 0-5% | 0.2-0.5% | Crack Control |
| Water | 20-60% | 33-45% | Activator/Lubricant |

TABLE 13

50 pcf Target Density (Fly Ash + GGBFS)

| Ingredient | Wt % | Preferred Wt % | Function |
|---|---|---|---|
| #3 Vermiculite | 5-25% | 10-15% | Lightweight Filler Aggregate |
| GGBFS | 0-50% | 10-16% | Cementitious |
| Fly Ash | 0-50% | 15-22% | Cementitious |
| Calcium Hydroxide | 0-10% | 1-3% | Cementitious |
| Sodium Metasilicate | 1-15% | 4-7% | Activator |
| Fine Sodium Metasilicate | 1-15% | 4-7 | Activator |
| Magnesium Oxide | 0-2% | .04-.08% | Shrinkage Reducer |
| Sulfonated Formaldehyde | 0-2% | 0.05-0.1% | Water Reducer |
| Protein | 0-4% | 0.09-0.2% | Curing Enhancement |
| Fumed Silica | 0-4% | 0.15-0.25% | Rheology Enhancement |
| 6 mm Glass Micro Fibers | 0-5% | 0.2-0.5% | Crack Control |
| Water | 20-60 | 38-48 | Activator/Lubricant |

EXAMPLES

Examples 1-12

Mixtures according to the present invention have been prepared and tested for strength, equilibrium density, bond strength, and the ability to block a treated substrate, e.g., 0.25 inch steel unless otherwise noted, from exposure to 2000° F. as defined by the ANSI/UL1709 or ANSI/UL263 (ASTM E119) procedures. Curing was done at the stated temperature and 50% humidity. Temperatures were taken with a non-exposed thermocouple. The results are shown in the tables below.

Example 1—50 pcf Target Density

| | MORTAR CONSISTENCY | |
|---|---|---|
| Ingredient | Low Slump (wt %) Trowel Applied (1" to 3" Slump) | Medium Slump (wt %) Spray Applied (2" to 6" Slump) |
| Expanded Glass 1-2 mm | 12.7 | 12.4 |
| Expanded Glass 0.5-1 mm | 14.9 | 11.3 |
| Size #3 Vermiculite | 0.0 | 3.9 |
| GGBFS | 16.9 | 21.4 |
| Class F Fly Ash | 27.0 | 21.4 |
| Sodium Metasilicate | 6.2 | 8.6 |
| Sodium Tetraborate | 4.2 | 0.0 |
| 6 mm" Glass Micro Fibers | 0.5 | 0.5 |
| Fumed Silica | 0.0 | 0.8 |
| Protein | 0.1 | 0.1 |
| SIKA CLSM Entrainment | 0.0 | 0.3 |
| Water | 17.6 | 19.3 |
| 75 F. | | |
| Strength, 24 hours, psi | 390 | 210 |
| Strength, 28 days, psi | 2,250 | 1,730 |
| Equilibrium Density, pcf | 50.3 | 53.5 |
| Bond Strength, 28 Days, psf | 21,000 | 14,880 |
| 120 F. | | |
| Strength, 24 hours, psi | 1,100 | 850 |
| Strength, 8 hours, psi | 2,110 | 1,770 |
| Equilibrium Density, pcf | 50.3 | 53.5 |
| Bond Strength, 28 Days, psf | 21,750 | 14,210 |

Heat Exposure Test UL 1709

| | Temperature (° F.) |
|---|---|
| ⅞" Thick Layer | |
| 1-hour | 832 |
| 2-hours | 913 |
| 3-hours | 931 |
| 1-⅛" Thick Layer | |
| 1-hour | 744 |
| 2-hours | 867 |
| 3-hours | 885 |
| 1-⅜" Thick Layer | |
| 1-hour | 639 |
| 2-hours | 840 |
| 3-hours | 851 |
| 1-⅝" Thick Layer | |
| 1-hour | 428 |
| 2-hours | 751 |
| 3-hours | 772 |

Example 2—50 pcf Target Density

| | MORTAR CONSISTENCY | |
|---|---|---|
| Ingredient | Low Slump (wt %) Trowel Applied (1" to 3" Slump) | Medm Slump (wt %) Spray Applied (2" to 6" Slump) |
| Expanded Glass 1-2 mm | 21.5 | 18.1 |
| Cenospheres | 3.4 | 3.2 |
| 3M Glass Bubbles .05 to .1 mm | 2.2 | 2.1 |
| Size #3 Vermiculite | 0 | 3.8 |
| Perlite - .3 to 1 mm | 7.5 | 7.1 |
| GGBFS | 20.4 | 13.3 |
| Class F Fly Ash | 20.4 | 19.3 |
| Sodium Metasilicate | 6.8 | 6.4 |
| Sodium Tetraborate | 3.7 | 3.5 |
| 6 mm" Glass Micro Fibers | 0.34 | 0.51 |
| Fumed Silica | 0.13 | 0.54 |

| Ingredient | MORTAR CONSISTENCY | |
|---|---|---|
| | Low Slump (wt %) Trowel Applied (1" to 3" Slump) | Medm Slump (wt %) Spray Applied (2" to 6" Slump) |
| Protein | 0.41 | 0.39 |
| Water | 13.3 | 15.7 |
| 75 F. | | |
| Strength, 24 hours, psi | 285 | 235 |
| Strength, 28 days, psi | 1,880 | 1,390 |
| Equilibrium Density, pcf | 51.8 | 49.2 |
| Bond Strength, 28 Days, psf | 18,550 | 15,230 |
| 120 F. | | |
| Strength, 24 hours, psi | 970 | 805 |
| Strength, 8 hours, psi | 1,905 | 1,740 |
| Equilibrium Density, pcf | 51.8 | 49.2 |
| Bond Strength, 28 Days, psf | 21,310 | 19,890 |
| Heat Exposure UL 1709 Procedure | | |
| | | Temperature (° F.) |
| ⅞" Thick Layer | | |
| 1-hour | — | 885 |
| 2-hours | — | 910 |
| 3-hours | — | 920 |
| 1⅛" Thick Layer | | |
| 1-hour | — | 709 |
| 2-hours | — | 786 |
| 3-hours | — | 799 |
| 1⅜" Thick Layer | | |
| 1-hour | — | 588 |
| 2-hours | — | 710 |
| 3-hours | — | 750 |
| 1⅝" Thick Layer on ¼" steel (° F.) | | |
| 1-hour | — | 444 |
| 2-hours | — | 625 |
| 3-hours | — | 715 |

Example 3—50 pcf Target Density

| Ingredient | MORTAR CONSISTENCY | |
|---|---|---|
| | Low Slump (wt %) Trowel Applied (1" to 3" Slump) | Medium Slump (wt %) Spray Applied (2" to 6" Slump) |
| Perlite - 1 to 2 mm | 17.39 | 15.4 |
| Cenospheres | 6.78 | 6.5 |
| Perlite - 0.3 to 1 mm | 1.7 | 1.1 |
| GGBFS | 47.3 | 48.6 |
| Sodium Metasilicate | 8.4 | 7.1 |
| Sodium Tetraborate | 3.0 | 2.4 |
| 6 mm" Glass Micro Fibers | 0.42 | 0.69 |
| Fumed Silica | 0.17 | 0.56 |
| Protein | 0.17 | 0.17 |
| Water | 14.7 | 17.5 |
| 75 F. | | |
| Strength, 24 hours, psi | 215 | 165 |
| Strength, 28 days, psi | 1,240 | 990 |
| Equilibrium Density, pcf | 53.1 | 49.0 |
| Bond Strength, 28 Days, psf | 14,430 | 11,990 |
| 120 F. | | |
| Strength, 24 hours, psi | 670 | 505 |
| Strength, 8 hours, psi | 1,190 | 1,510 |
| Equilibrium Density, pcf | 52.3 | 54.4 |
| Bond Strength, 28 Days, psf | 14,310 | 12,005 |
| Heat Exposure UL 1709 | | |
| ⅞" Thick Layer on ¼" steel (° F.) | | |
| 1-hour | — | 799 |
| 2-hours | — | 857 |
| 3-hours | — | 911 |
| 1⅛" Thick Layer on ¼" steel (° F.) | | |
| 1-hour | — | 795 |
| 2-hours | — | 825 |
| 3-hours | — | 888 |
| 1⅜" Thick Layer on ¼" steel (° F.) | | |
| 1-hour | — | 628 |
| 2-hours | — | 770 |
| 3-hours | — | 855 |
| 1⅝" Thick Layer on ¼" steel (° F.) | | |
| 1-hour | — | 489 |
| 2-hours | — | 589 |
| 3-hours | — | 734 |

Example 4—50 pcf Target Density

| Ingredient | MORTAR CONSISTENCY | |
|---|---|---|
| | Low Slump (wt %) Trowel Applied (1" to 3" Slump) | Medium Slump (wt %) Spray Applied (2" to 6" Slump) |
| Perlite - 1 to 2 mm | 17.5 | 16.7 |
| Calcium Hydroxide | 4.3 | 4.2 |
| Size #3 Vermiculite | 3.1 | 3.0 |
| Fly Ash | 42.8 | 42.0 |
| Sodium Metasilicate | 9.7 | 9.6 |
| Sodium Tetraborate | 5.6 | 4.6 |
| 6 mm" Glass Micro Fibers | 0.52 | 0.67 |
| Fumed Silica | 0.17 | 0.17 |
| Protein | 0.17 | 0.17 |
| Water | 16.2 | 18.9 |
| 75 F. | | |
| Strength, 24 hours, psi | 580 | 465 |
| Strength, 28 days, psi | 2,450 | 2405 |
| Equilibrium Density, pcf | 51.2 | 52.8 |
| Bond Strength, 28 Days, psf | 22,860 | 25,140 |
| 120 F. | | |
| Strength, 24 hours, psi | 2,370 | 2440 |
| Strength, 8 hours, psi | 2,405 | 2510 |
| Equilibrium Density, pcf | 55.3 | 52.8 |
| Bond Strength, 28 Days, psf | 21,000 | 23,880 |
| Heat Exposure UL 1709 | | |
| ⅞" Thick Layer on 1/4" steel (° F.) | | |
| 1-hour | — | 731 |
| 2-hours | — | 805 |
| 3-hours | — | 922 |

-continued

| | MORTAR CONSISTENCY | |
|---|---|---|
| | Low Slump (wt %) Trowel Applied | Medium Slump (wt %) Spray Applied |
| Ingredient | (1" to 3" Slump) | (2" to 6" Slump) |
| 1⅛" Thick Layer on ¼" steel (° F.) | | |
| 1-hour | — | 610 |
| 2-hours | — | 723 |
| 3-hours | — | 842 |
| 1⅜" Thick Layer on ¼" steel (° F.) | | |
| 1-hour | — | 577 |
| 2-hours | — | 688 |
| 3-hours | — | 799 |
| 1⅝" Thick Layer on ¼" steel (° F.) | | |
| 1-hour | — | 365 |
| 2-hours | — | 592 |
| 3-hours | — | 653 |

Example 5—50 pcf Target Density
(Vermiculite+Fly Ash+GGBFS)

| | MORTAR CONSISTENCY | |
|---|---|---|
| Ingredient | High Viscosity (wt %) Trowel Applied | Low Viscosity (wt %) Spray Applied |
| Sulfonated Formaldehyde, % | 0.080 | 0.080 |
| Size #3 Vermiculite, % | 12.1 | 11.4 |
| Magnesium Oxide, % | 0.060 | 0.060 |
| GGBFS, % | 16.7 | 15.7 |
| Class F Fly Ash, % | 23.4 | 22.0 |
| Sodium Metasilicate, % | 6.7 | 6.3 |
| Sodium Tetraborate, % | 3.4 | 3.1 |
| 6 mm" Glass Micro Fibers, % | 0.4 | 0.4 |
| Fumed Silica, % | 0.2 | 0.2 |
| Protein, % | 0.2 | 0.2 |
| Water, % | 36.8 | 40.8 |
| 75 F. | | |
| Strength, 28 days, psi | 1,890 | 1,240 |
| Equilibrium Density, pcf | 50.2 | 50.2 |
| Bond Strength, 28 Days, psf | 14,890 | 14,560 |
| 120 F. | | |
| Strength, 8 hours, psi | 490 | 420 |
| Strength, 24 hours, psi | 1,560 | 1,440 |
| Equilibrium Density, pcf | 50.2 | 50.2 |
| Bond Strength, 28 Days, psf | 14,880 | 14,500 |
| Heat Exposure Test UL263/ASTM E119 | | |
| Layer on W5 × 19 Steel Column (in) | | 1000° F. End Point (mins) |
| 0.5 | — | 57 |
| 1.0 | — | 88 |
| 1.5 | — | 175 |
| 2.0 | — | 241 |

Example 6—50 pcf Target Density
(Vermiculite+Fly Ash)

| | MORTAR CONSISTENCY | |
|---|---|---|
| Ingredient | High Viscosity (wt %) Trowel Applied | Low Viscosity (wt %) Spray Applied |
| Sulfonated Formaldehyde, % | 0.080% | 0.080% |
| Magnesium Oxide, % | 0.06% | 0.06% |
| Size #3 Vermiculite, % | 12.35% | 11.56% |
| Class F Fly Ash, % | 39.16% | 36.67% |
| Calcium Hydroxide, % | 2.00% | 2.00% |
| Sodium Metasilicate, % | 6.81% | 6.38% |
| Sodium Tetraborate, % | 3.41% | 3.19% |
| 6 mm" Glass Micro Fibers, % | 0.43% | 0.40% |
| Fumed Silica, % | 0.22% | 0.21% |
| Protein, % | 0.17% | 0.16% |
| Water, % | 37.46% | 41.45% |
| 75 F. | | |
| Strength, 28 days, psi | 2,240 | 2,280 |
| Equilibrium Density, pcf | 49.1 | 50.0 |
| Bond Strength, 28 Days, psf | 19,880 | 18,620 |
| 120 F. | | |
| Strength, 8 hours, psi | 620 | 780 |
| Strength, 24 hours, psi | 1,870 | 1,800 |
| Equilibrium Density, pcf | 49.1 | 50.0 |
| Bond Strength, 28 Days, psf | 20,200 | 18,980 |
| Heat Exposure Test UL263/ASTM E119 | | |
| Layer on W5 × 19 Steel Column (in) | | 1000° F. End Point (mins) |
| 0.5 | — | 62 |
| 1.0 | — | 128 |
| 1.5 | — | 192 |
| 2.0 | — | 267 |

Example 7—50 pcf Target Density
(Vermiculite+GGBFS)

| | MORTAR CONSISTENCY | |
|---|---|---|
| Ingredient | High Viscosity (wt %) Trowel Applied | Low Viscosity (wt %) Spray Applied |
| Sulfonated Formaldehyde, % | 0.080% | 0.080% |
| Magnesium Oxide, % | 0.06% | 0.06% |
| Size #3 Vermiculite, % | 12.14% | 11.38% |
| GGBFS, % | 40.18% | 37.66% |
| Sodium Metasilicate, % | 6.70% | 6.28% |
| Sodium Tetraborate, % | 3.35% | 3.14% |
| 6 mm" Glass Micro Fibers, % | 0.42% | 0.39% |
| Fumed Silica, % | 0.22% | 0.20% |
| Protein, % | 0.16% | 0.15% |
| Water, % | 36.83% | 40.80% |
| Sulfonated Formaldehyde, % | 0.080% | 0.080% |
| 75 F. | | |
| Strength, 28 days, psi | 2,860 | 2,730 |
| Equilibrium Density, pcf | 49.0 | 48.8 |
| Bond Strength, 28 Days, psf | 22,310 | 19,680 |
| 120 F. | | |
| Strength, 8 hours, psi | 720 | 770 |
| Strength, 24 hours, psi | 2,970 | 2,960 |
| Equilibrium Density, pcf | 49.0 | 48.8 |
| Bond Strength, 28 Days, psf | 21,000 | 24,390 |

|  | MORTAR CONSISTENCY | |
|---|---|---|
| Ingredient | High Viscosity (wt %) Trowel Applied | Low Viscosity (wt %) Spray Applied |
| Heat Exposure Test UL263/ASTM E119 | | |
| Layer on W5 × 19 Steel Column (in) |  | 1000° F. Endpoint (mins) |
| 0.5 | — | 63 |
| 1.0 | — | 125 |
| 1.5 | — | 185 |
| 2.0 | — | 255 |

Example 8—50 pcf Target Density (Vermiculite+Perlite+EPS)

|  | MORTAR CONSISTENCY | |
|---|---|---|
| Ingredient | High Viscosity (wt %) Trowel Applied | Low Viscosity (wt %) Spray Applied |
| Perlite 1-2 mm, % | 5.66% | 5.46% |
| Expanded Polystyrene, % | 1.89% | 1.82% |
| Sulfonated Formaldehyde, % | 0.080% | 0.080% |
| Size #3 Vermiculite, % | 6.61% | 6.37% |
| Magnesium Oxide, % | 0.06% | 0.06% |
| GGBFS, % | 18.88% | 18.19% |
| Class F Fly Ash, % | 26.43% | 25.46% |
| Sodium Metasilicate, % | 7.55% | 7.28% |
| Sodium Tetraborate, % | 3.78% | 3.64% |
| 6 mm" Glass Micro Fibers, % | 0.47% | 0.46% |
| Fumed Silica, % | 0.24% | 0.23% |
| Protein | 0.18 | 0.18 |
| Water | 28.31 | 30.92 |
| 75 F. | | |
| Strength, 28 days, psi | 3,150 | 3,210 |
| Equilibrium Density, pcf | 48.9 | 49.1 |
| Bond Strength, 28 Days, psf | 24,850 | 26,660 |
| 120 F. | | |
| Strength, 8 hours, psi | 680 | 750 |
| Strength, 24 hours, psi | 2,930 | 3,140 |
| Equilibrium Density, pcf | 48.9 | 49.1 |
| Bond Strength, 28 Days, psf | 24,000 | 25,800 |
| Heat Exposure Test UL263/ASTM E119 | | |
| Layer on W5 X 19 Steel Column (in) | | 1000° F. Endpoint (mins) |
| 0.5 | — | 47 |
| 1.0 | — | 77 |
| 1.5 | — | 161 |
| 2.0 | — | 253 |

Example 9—40 pcf Target Density (Vermiculite)

|  | MORTAR CONSISTENCY | |
|---|---|---|
| Ingredient | High Viscosity (wt %) Trowel Applied | Low Viscosity (wt %) Spray Applied |
| Sulfonated Formaldehyde | 0.080 | 0.080 |
| Magnesium Oxide | 0.06 | 0.06 |
| Size #3 Vermiculite | 13.08 | 11.98 |
| GGBFS | 14.30 | 12.27 |
| Class F Fly Ash | 20.00 | 18.90 |
| Calcium Hydroxide | 2.50 | 2.50 |
| Sodium Metasilicate | 6.16 | 5.64 |
| Sodium Tetraborate | 3.08 | 2.82 |
| 6 mm" Glass Micro Fibers | 0.39 | 0.35 |
| Fumed Silica | 0.20 | 0.18 |
| Protein | 0.15 | 0.14 |
| Water | 40.01 | 45.08 |
| 75 F. | | |
| Strength, 28 days, psi | 1,960 | 1,820 |
| Equilibrium Density, pcf | 39.6 | 39.9 |
| Bond Strength, 28 Days, psf | 11,240 | 10,990 |
| 120 F. | | |
| Strength, 8 hours, psi | 590 | 590 |
| Strength, 24 hours, psi | 1,960 | 1,990 |
| Equilibrium Density, pcf | 39.6 | 39.9 |
| Bond Strength, 28 Days, psf | 12,110 | 11,890 |
| Heat Exposure Test UL263/ASTM E119 | | |
| Layer on W5 X 19 Steel Column (in) | | 1000° F. Endpoint (mins) |
| 0.5 | — | 66 |
| 1.0 | — | 94 |
| 1.5 | — | 188 |
| 2.0 | — | 278 |

Example 10—40 pcf Target Density (Vermiculite+EPS)

|  | MORTAR CONSISTENCY | |
|---|---|---|
| Ingredient | High Viscosity (wt %) Trowel Applied | Low Viscosity (wt %) Spray Applied |
| Sulfonated Formaldehyde | 0.080 | 0.080 |
| Expanded Polystyrene | 2.44 | 2.33 |
| Magnesium Oxide | 0.06 | 0.06 |
| Size #3 Vermiculite | 12.20 | 11.63 |
| GGBFS | 16.27 | 15.51 |
| Class F Fly Ash | 22.77 | 21.71 |
| Sodium Metasilicate | 6.51 | 6.20 |
| Sodium Tetraborate | 3.25 | 3.10 |
| 6 mm" Glass Micro Fibers | 0.41 | 0.39 |
| Fumed Silica | 0.21 | 0.20 |
| Protein | 0.16 | 0.15 |
| Water | 35.79 | 38.77 |
| 75 F. | | |
| Strength, 28 days, psi | 960 | 820 |
| Equilibrium Density, pcf | 39.2 | 40.8 |
| Bond Strength, 28 Days, psf | 13,200 | 12,860 |
| 120 F. | | |
| Strength, 8 hours, psi | 780 | 790 |
| Strength, 24 hours, psi | 1,980 | 1,910 |
| Equilibrium Density, pcf | 39.0 | 37.6 |
| Bond Strength, 28 Days, psf | 13,240 | 13,100 |
| Heat Exposure Test UL263/ASTM E119 | | |
| Layer on W5 X 19 Steel Column (in) | | 1000° F. Endpoint (mins) |
| 0.5 | — | 66 |
| 1.0 | — | 93 |
| 1.5 | — | 192 |
| 2.0 | — | 267 |

Example 11—25 pcf Target Density (Vermiculite+Perlite+EPS)

| | MORTAR CONSISTENCY | |
|---|---|---|
| Ingredient | High Viscosity Trowel Applied | Low Viscosity Spray Applied |
| Perlite 1-2 mm, % | 7.44% | 7.41% |
| Expanded Polystyrene, % | 2.01% | 2.03% |
| Sulfonated Formaldehyde, % | 0.080% | 0.080% |
| Size #3 Vermiculite, % | 8.33% | 8.21% |
| Magnesium Oxide, % | 0.06% | 0.06% |
| GGBFS, % | 17.66% | 17.54% |
| Class F Fly Ash, % | 24.33% | 24.38% |
| Sodium Metasilicate, % | 7.55% | 7.28% |
| Sodium Tetraborate, % | 3.78% | 3.64% |
| 6 mm" Glass Micro Fibers, % | 0.47% | 0.46% |
| Fumed Silica, % | 0.24% | 0.23% |
| Protein, % | 0.18% | 0.18% |
| Water, % | 27.86% | 28.51% |
| 75 F. | | |
| Strength, 28 days, psi | 2,470 | 2,560 |
| Equilibrium Density, pcf | 24.4 | 25.3 |
| Bond Strength, 28 Days, psf | 18,960 | 18,900 |
| 120 F. | | |
| Strength, 8 hours, psi | 340 | 400 |
| Strength, 24 hours, psi | 2,260 | 2,290 |
| Equilibrium Density, pcf | 24.4 | 25.3 |
| Bond Strength, 28 Days, psf | 19,110 | 19,240 |

| Heat Exposure Test UL263/ASTM E119 | | |
|---|---|---|
| Layer Thickness (in.) | | 1000° F. Endpoint (mins) |
| 0.5 | — | 44 |
| 1 | — | 70 |
| 1.5 | — | 159 |
| 2 | — | 245 |

Example 12—15 pcf Target Density (Vermiculite)

| Ingredient | High Viscosity (wt %) Spray Applied |
|---|---|
| Sulfonated Formaldehyde, % | 0.080% |
| Magnesium Oxide, % | 0.060% |
| Size #3 Vermiculite, % | 15.34% |
| Perlite - .3 to 1 mm, % | 5.00% |
| GGBFS, % | 10.96% |
| Class F Fly Ash, % | 13.75% |
| Fine Sodium Metasilicate, % | 4.79% |
| Calcium Hydroxide, % | 4.00% |
| Sodium Tetraborate, % | 2.10% |
| 6 mm" Glass Micro Fibers, % | 0.72% |
| Fumed Silica, % | 0.15% |
| Protein, % | 0.12% |
| Water, % | 43.07% |
| 75 F. | |
| Strength, 28 days, psi | 455 |
| Equilibrium Density, pcf | 14.1 |
| Bond Strength, 28 Days, psf | 2,990 |
| 120 F. | |
| Strength, 8 hours, psi | 165 |
| Strength, 24 hours, psi | 620 |
| Equilibrium Density, pcf | 14.1 |
| Bond Strength, 28 Days, psf | 3,680 |

| Heat Exposure Test UL263/ASTM E119 | |
|---|---|
| Layer on W5 X 19 Steel Column (in) | 1000° F. Endpoint (mins) |
| 0.5 | 51 |
| 1.0 | 79 |
| 1.5 | 118 |
| 2.0 | 188 |

Example 13—15 pcf Target Density

| Ingredient | High Viscosity (wt %) Air Applied |
|---|---|
| Sulfonated Formaldehyde | 0.080 |
| Magnesium Oxide | 0.060 |
| Size #3 Vermiculite | 15.03 |
| Expanded Polystyrene | 0.68 |
| GGBFS | 13.66 |
| Class F Fly Ash | 19.13 |
| Fine Sodium Metasilicate | 5.47 |
| Sodium Tetraborate | 2.73 |
| 6 mm Basalt Micro Fibers | 0.48 |
| Fumed Silica | 0.18 |
| Protein | 0.13 |
| Water | 42.36 |
| 75 F. | |
| Strength, 28 days, psi | 525 |
| Equilibrium Density, pcf | 15.0 |
| Bond Strength, 28 Days, psf | 3,292 |
| 120 F. | |
| Strength, 8 hours, psi | 180 |
| Strength, 24 hours, psi | 605 |
| Equilibrium Density, pcf | 15.0 |
| Bond Strength, 28 Days, psf | 3,300 |

| Heat Exposure Test UL263/ASTM E119 | |
|---|---|
| Layer on W5 X 19 Steel Column (in) | 1000° F. Endpoint (mins) |
| 0.5 | 57 |
| 1.0 | 83 |
| 1.5 | 125 |
| 2.0 | 196 |

The formulations reported above all exhibit low or no meaningful shrinkage, provide excellent fire resistance for the protected substrate, and reflect formulations that provide consistent equilibrium densities to comply with the architect's design specifications for the treated buildings. The tested coatings provide occupants time to escape a burning building; from about one to more than three hours. All of these benefits flow from a geopolymer coating that makes advantageous use of waste particulates from coal burning and metals processing while also reducing the carbon footprint of the product by avoiding the use of Portland cement and its attendant generation of greenhouse gases associated with Portland cement production.

All patents and publications mentioned in this specification are indicative of the levels of those skilled in the art to which the invention pertains. All patents and publications are herein incorporated by reference to the same extent as if each individual publication was specifically and individually indicated to be incorporated by reference.

It is to be understood that while a certain form of the invention is illustrated, it is not to be limited to the specific form or arrangement herein described and shown. It will be apparent to those skilled in the art that various changes may be made without departing from the scope of the invention and the invention is not to be considered limited to what is shown and described in the specification and any drawings/figures included herein.

One skilled in the art will readily appreciate that the present invention is well adapted to carry out the objectives and obtain the ends and advantages mentioned, as well as those inherent therein. The embodiments, methods, procedures and techniques described herein are presently representative of the preferred embodiments, are intended to be exemplary and are not intended as limitations on the scope. Changes therein and other uses will occur to those skilled in the art which are encompassed within the spirit of the invention and are defined by the scope of the appended claims. Although the invention has been described in connection with specific preferred embodiments, it should be understood that the invention as claimed should not be unduly limited to such specific embodiments. Indeed, various modifications of the described modes for carrying out the invention which are obvious to those skilled in the art are intended to be within the scope of the following claims.

The invention claimed is:

1. A fire-resistant, geopolymer coating composition that is free of Portland cement and which exhibits a predetermined equilibrium density within the range from about 15-60 pounds per cubic foot and a compressive strength within the range of 200-3000 psi, said composition comprising:
   15-50 wt % of at least one lightweight aggregate having a bulk specific gravity of less than 1.0 and a diameter ranging from about 0.025 mm to about 12.5 mm;
   5-60 wt % of at least one alkali-activated, cementitious material;
   2-15 wt % of at least one activator for said alkali-activated, cementitious material;
   0-15 wt % of at least one set-time retardant;
   0.01-5 wt % of at least one alkali-resistant fiber;
   0-2 wt % of magnesium oxide in an amount sufficient to control shrinkage in said mixture when cured;
   0-4 wt % of a water reducer;
   0-5 wt % of a protein or synthetic protein material;
   0-4 wt % of a rheology enhancer; and
   water.

2. A fire-resistant, geopolymer coating composition according to claim 1 wherein said coating composition exhibits an equilibrium density of about 15 pounds per cubic foot.

3. A fire-resistant, geopolymer coating composition according to claim 2 which comprises:

| Ingredient | Wt % |
| --- | --- |
| #3 Vermiculite | 5-50% |
| Expanded Polystyrene (EPS) | 0.01-5% |
| GGBFS | 5-50% |
| Fly Ash | 5-50% |
| Sodium Tetraborate | 1-7% |
| Sodium Metasilicate | 2-15% |
| Magnesium Oxide | 0.02-.5% |
| Sulfonated Formaldehyde | 0.05-.5% |
| Protein | 0.01-5% |
| Fumed Silica | 0.01-5% |
| Basalt Micro Fibers | 0.01-5% |
| Water | 20-60%. |

4. A fire-resistant, geopolymer coating composition according to claim 3 which comprises:

| Ingredient | Wt % |
| --- | --- |
| #3 Vermiculite | 10-25% |
| Expanded Polystyrene (EPS) | 0.2%-0.9% |
| GGBFS | 10-20% |
| Fly Ash | 10-25% |
| Sodium Tetraborate | 1-5% |
| Fine Sodium Metasilicate | 3-8% |
| Magnesium Oxide | 0.04-0.1 |
| Sulfonated Formaldehyde | 0.05-0.1% |
| Protein | 0.09-0.16% |
| Fumed Silica | 0.14-0.23% |
| Basalt Micro Fibers | 0.1-0.7% |
| Water | 38-48%. |

5. A fire-resistant, geopolymer coating composition according to claim 2 which comprises:

| Ingredient | Wt % |
| --- | --- |
| #3 Vermiculite | 5-50% |
| Perlite | 1-20% |
| GGBFS | 5-50% |
| Fly Ash | 5-50% |
| Calcium Hydroxide | 0-10% |
| Sodium Tetraborate | 1-7% |
| Sodium Metasilicate | 3-15% |
| Magnesium Oxide | 0.02-0.5% |
| Sulfonated Formaldehyde | 0.05-0.5% |
| Protein | 0.01-5% |
| Fumed Silica | 0.01-5% |
| 6 mm Glass Micro Fibers | 0.01-5% |
| Water | 20-60. |

6. A fire-resistant, geopolymer coating composition according to claim 5 which comprises:

| Ingredient | Wt % |
| --- | --- |
| #3 Vermiculite | 10-18% |
| Perlite | 2-7% |
| GGBFS | 8-14% |
| Fly Ash | 11-16% |
| Calcium Hydroxide | 1-7% |
| Sodium Tetraborate | 1-3% |
| Sodium Metasilicate | 2-7% |
| Magnesium Oxide | 0.02-0.1% |
| Sulfonated Formaldehyde | 0.05-0.1% |
| Protein | 0.09-0.2% |
| Fumed Silica | 0.15-0.25% |
| 6 mm Glass Micro Fibers | 0.2-0.5% |
| Water | 38-48. |

7. A fire-resistant, geopolymer coating composition according to claim 2 which comprises:

| Ingredient | Range (wt %) |
| --- | --- |
| Sulfonated Formaldehyde | 0.05-0.5 |
| Magnesium Oxide | 0.02-0.5 |
| Size #3 Vermiculite | 10-50 |
| Perlite - .3 to 1 mm | 1-20 |
| GGBFS | 5-50 |
| Class F Fly Ash | 5-50 |
| Sodium Metasilicate | 3-15 |
| Sodium Tetraborate | 1-7 |
| 6 mm" Glass Micro Fibers | 0.01-5 |
| Fumed Silica | 0.01-5 |
| Protein | 0.01-5 |
| Water | 20-60. |

8. A fire-resistant, geopolymer coating composition according to claim 7 which comprises:

| Ingredient | Range (wt %) |
|---|---|
| Sulfonated Formaldehyde | 0.06-0.1 |
| Magnesium Oxide | 0.04-0.08 |
| Size #3 Vermiculite | 10-20 |
| Perlite - 0.3 to 1 mm | 2-10 |
| GGBFS | 7-15 |
| Class F Fly Ash | 10-25 |
| Sodium Metasilicate | 3-10 |
| Sodium Tetraborate | 1-4 |
| 6 mm" Glass Micro Fibers | 0.3-1.2 |
| Fumed Silica | 0.1-0.25 |
| Protein | 0.09-0.2 |
| Water | 35-50. |

9. A fire-resistant, geopolymer coating composition according to claim 1 wherein said coating composition exhibits an equilibrium density of about 40 pounds per cubic foot.

10. A fire-resistant, geopolymer coating composition according to claim 9 wherein said coating composition comprises:

| Ingredient | Wt % |
|---|---|
| #3 Vermiculite | 5-25% |
| Expanded Polystyrene | 0.2-5% |
| GGBFS | 5-50% |
| Fly Ash | 5-50% |
| Sodium Metasilicate | 3-15% |
| Sodium Tetraborate | 1-7% |
| Magnesium Oxide | 0.02-0.5% |
| Sulfonated Formaldehyde | 0.05-.5% |
| Protein | 0.01-5% |
| Fumed Silica | 0.01-5% |
| 6 mm Glass Micro Fibers | 0.01-5% |
| Water | 15-70%. |

11. A fire-resistant, geopolymer coating composition according to claim 10 wherein said coating composition comprises:

| Ingredient | Wt % |
|---|---|
| #3 Vermiculite | 10-15% |
| Expanded Polystyrene | 2-4% |
| GGBFS | 12-20% |
| Fly Ash | 17-24% |
| Sodium Metasilicate | 4-7% |
| Sodium Tetraborate | 2-5% |
| Magnesium Oxide | 0.04-0.08% |
| Sulfonated Formaldehyde | 0.05-0.1% |
| Protein | 0.13-0.18% |
| Fumed Silica | 0.15-0.25% |
| 6 mm Glass Micro Fibers | 0.35-0.45% |
| Water | 30-40%. |

12. A fire-resistant, geopolymer coating composition according to claim 9 wherein said coating composition comprises:

| Ingredient | Range (wt %) |
|---|---|
| Sulfonated Formaldehyde | 0.05-0.5 |
| Magnesium Oxide | 0.02-0.5 |
| Size #3 Vermiculite | 5-25 |
| GGBFS | 5-50 |
| Class F Fly Ash | 5-50 |
| Sodium Metasilicate | 3-15 |
| Sodium Tetraborate | 1-7 |
| 6 mm" Glass Micro Fibers | 0.01-5 |
| Fumed Silica | 0.01-5 |
| Protein | 0.01-5 |
| Water | 20-60. |

13. A fire-resistant, geopolymer coating composition according to claim 12 wherein said coating composition comprises:

| Ingredient | (wt %) |
|---|---|
| Sulfonated Formaldehyde | 0.06-0.1 |
| Magnesium Oxide | 0.04-0.08 |
| Size #3 Vermiculite | 8-18 |
| GGBFS | 5-20 |
| Class F Fly Ash | 15-30 |
| Sodium Metasilicate | 4-8 |
| Sodium Tetraborate | 1.5-4 |
| 6 mm" Glass Micro Fibers | 0.2-0.8 |
| Fumed Silica | 0.1-0.8 |
| Protein | 0.08-0.25 |
| Water | 30-50. |

14. A fire-resistant, geopolymer coating composition according to claim 9 wherein said coating composition comprises:

| Ingredient | Wt % |
|---|---|
| #3 Vermiculite | 5-25% |
| GGBFS | 0-50% |
| Fly Ash | 0-50% |
| Calcium Hydroxide | 0.1-10% |
| Sodium Metasilicate | 3-15% |
| Sodium Tetraborate | 1-7% |
| Magnesium Oxide | 0.02-0.5% |
| Sulfonated Formaldehyde | 0.05-0.5% |
| Protein | 0.01-5% |
| Fumed Silica | 0.01-5% |
| 6 mm" Glass Micro Fibers | 0.01-5% |
| Water | 20-60%. |

15. A fire-resistant, geopolymer coating composition according to claim 14 wherein said coating composition comprises:

| Ingredient | Wt % |
|---|---|
| #3 Vermiculite | 10-15% |
| GGBFS | 10-16% |
| Fly Ash | 15-22% |
| Calcium Hydroxide | 1-3% |
| Sodium Metasilicate | 4-7% |
| Sodium Tetraborate | 1-5% |
| Magnesium Oxide | 0.04-.08% |
| Sulfonated Formaldehyde | 0.05-0.1% |
| Protein | 0.12-0.18% |
| Fumed Silica | 0.15-0.25% |
| 6 mm Glass Micro Fibers | 0.3-0.5% |
| Water | 38-48%. |

16. A fire-resistant, geopolymer coating composition according to claim 1 wherein said coating composition exhibits an equilibrium density of about 50 pounds per cubic foot.

17. A fire-resistant, geopolymer coating composition according to claim 16 wherein said coating composition comprises:

| Ingredient | Range (wt %) |
| --- | --- |
| Perlite 1-2 mm | 3-8 |
| Expanded Polystyrene | 0.10-3 |
| Sulfonated Formaldehyde | 0.05-0.5 |
| Size #3 Vermiculite | 3-15 |
| Magnesium Oxide | 0.02-0.5 |
| GGBFS | 5-50 |
| Class F Fly Ash | 5-50 |
| Sodium Metasilicate | 3-15 |
| Sodium Tetraborate | 1-7 |
| 6 mm" Glass Micro Fibers | 0.01-5 |
| Fumed Silica | 0.01-5 |
| Protein | 0.01-5 |
| Water | 15-70. |

18. A fire-resistant, geopolymer coating composition according to claim 17 wherein said coating composition comprises:

| Ingredient | Wt % |
| --- | --- |
| Perlite 1-2 mm | 5-6 |
| Expanded Polystyrene | 1-2.5 |
| Sulfonated Formaldehyde | 0.05-0.1 |
| Size #3 Vermiculite | 4-8 |
| Magnesium Oxide | 0.04-0.1 |
| GGBFS | 10-25 |
| Class F Fly Ash | 20-30 |
| Sodium Metasilicate | 5-10 |
| Sodium Tetraborate | 2-5.5 |
| 6 mm" Glass Micro Fibers | 0.3-1 |
| Fumed Silica | 0.01-1 |
| Protein | 0.01-0.5 |
| Water | 20-40. |

19. A fire-resistant, geopolymer coating composition according to claim 16 wherein said coating composition comprises:

| Ingredient | Wt % |
| --- | --- |
| #3 Vermiculite | 3-15% |
| Perlite | 1-20% |
| Expanded Polystyrene | 0.1-3% |
| GGBFS | 5-50% |
| Fly Ash | 5-50% |
| Sodium Metasilicate | 3-15% |
| Sodium Tetraborate | 1-7% |
| Magnesium Oxide | 0.02-0.5% |
| Sulfonated Formaldehyde | 0.05-0.5% |
| Protein | 0.01-5% |
| Fumed Silica | 0-5% |
| 6 mm Glass Micro Fibers | 0-5% |
| Water | 20-60. |

20. A fire-resistant, geopolymer coating composition according to claim 19 wherein said coating composition comprises:

| Ingredient | Wt % |
| --- | --- |
| #3 Vermiculite | 4-8% |
| Perlite | 3-8% |
| Expanded Polystyrene | 1-3% |
| GGBFS | 15-23% |
| Fly Ash | 22-30% |
| Sodium Metasilicate | 4-8% |
| Sodium Tetraborate | 2-5% |
| Magnesium Oxide | 0.04-0.08% |
| Sulfonated Formaldehyde | 0.05-0.1% |
| Protein | 0.09-0.22% |
| Fumed Silica | 0.2-0.3% |
| 6 mm Glass Micro Fibers | 0.03-0.25% |
| Water | 22-35. |

21. A fire-resistant, geopolymer coating composition according to claim 16 wherein said coating composition comprises:

| Ingredient | Wt % |
| --- | --- |
| #3 Vermiculite | 7-25% |
| GGBFS | 20-50% |
| Sodium Metasilicate | 1-15% |
| Magnesium Oxide | 0-2% |
| Sodium Tetraborate | 1-7% |
| Sulfonated Formaldehyde | 0-4% |
| Protein | 0-4% |
| Fumed Silica | 0-4% |
| 6 mm Glass Micro Fibers | 0-4% |
| Water | 20-60%. |

22. A fire-resistant, geopolymer coating composition according to claim 21 wherein said coating composition comprises:

| Ingredient | Wt % |
| --- | --- |
| #3 Vermiculite | 10-15% |
| GGBFS | 35-44% |
| Sodium Metasilicate | 4-8% |
| Magnesium Oxide | 0.04-0.08% |
| Sodium Tetraborate | 2-5% |
| Sulfonated Formaldehyde | 0.05-0.1% |
| Protein | 0.09-0.2% |
| Fumed Silica | 0.15-0.25% |
| 6mm Glass Micro Fibers | 0.2-0.5% |
| Water | 38-45%. |

23. A fire-resistant, geopolymer coating composition according to claim 16 wherein said coating composition comprises:

| Ingredient | Wt % |
| --- | --- |
| #3 Vermiculite | 5-25% |
| Fly Ash | 0-50% |
| Calcium Hydroxide | 0-10% |
| Sodium Metasilicate | 1-15% |
| Sodium Tetraborate | 1-7% |
| Magnesium Oxide | 0-2% |
| Sulfonated Formaldehyde | 0-2% |
| Protein | 0-2% |
| Fumed Silica | 0-2% |
| 6 mm Glass Micro Fibers | 0-5% |
| Water | 20-60%. |

24. A fire-resistant, geopolymer coating composition according to claim 23 wherein said coating composition comprises:

| Ingredient | Wt % |
| --- | --- |
| #3 Vermiculite | 10-15% |
| Fly Ash | 32-45% |
| Calcium Hydroxide | 1-5% |
| Sodium Metasilicate | 4-8% |

-continued

| Ingredient | Wt % |
| --- | --- |
| Sodium Tetraborate | 2-5% |
| Magnesium Oxide | 0.04-0.08% |
| Sulfonated Formaldehyde | 0.05-0.1% |
| Protein | 0.09-0.2% |
| Fumed Silica | 0.15-0.25% |
| 6 mm Glass Micro Fibers | 0.2-0.5% |
| Water | 33-45%. |

25. A fire-resistant, geopolymer coating composition according to claim 16 wherein said coating composition comprises:

| Ingredient | Wt % |
| --- | --- |
| #3 Vermiculite | 5-25% |
| GGBFS | 0-50% |
| Fly Ash | 0-50% |
| Calcium Hydroxide | 0-10% |
| Sodium Metasilicate | 1-15% |
| Fine Sodium Metasilicate | 1-15% |
| Magnesium Oxide | 0-2% |
| Sulfonated Formaldehyde | 0-2% |
| Protein | 0-4% |
| Fumed Silica | 0-4% |
| 6 mm Glass Micro Fibers | 0-5% |
| Water | 20-60. |

26. A fire-resistant, geopolymer coating composition according to claim 25 wherein said coating composition comprises:

| Ingredient | Wt % |
| --- | --- |
| #3 Vermiculite | 10-15% |
| GGBFS | 10-16% |
| Fly Ash | 15-22% |
| Calcium Hydroxide | 1-3% |
| Sodium Metasilicate | 4-7% |
| Fine Sodium Metasilicate | 4-7 |
| Magnesium Oxide | .04-.08% |
| Sulfonated Formaldehyde | 0.05-0.1% |
| Protein | 0.09-0.2% |
| Fumed Silica | 0.15-0.25% |
| 6 mm Glass Micro Fibers | 0.2-0.5% |
| Water | 38-48. |

27. A fire-resistant, geopolymer coating composition according to claim 1 wherein said coating composition exhibits an equilibrium density of about 25 pounds per cubic foot.

28. A fire-resistant, geopolymer coating composition according to claim 27 wherein said coating composition comprises:

| Ingredient | Wt % |
| --- | --- |
| #3 Vermiculite | 3-15 |
| Perlite | 1-20 |
| Expanded Polystyrene | 0.1-3 |
| GGBFS | 5-50 |
| Fly Ash | 5-50 |
| Sodium Metasilicate | 3-15 |
| Sodium Tetraborate | 1-7 |
| Magnesium Oxide | 0.02-0.5 |
| Sulfonated Formaldehyde | 0.05-0.5 |
| Protein | 0.01-5 |
| Fumed Silica | 0.01-5 |
| 6 mm Glass Micro Fibers | 0.01-5 |
| Water | 20-60. |

29. A fire-resistant, geopolymer coating composition according to claim 28 wherein said coating composition comprises:

| Ingredient | Wt % |
| --- | --- |
| #3 Vermiculite | 6-10% |
| Perlite | 5-10% |
| Expanded Polystyrene | 1-3% |
| GGBFS | 15-23% |
| Fly Ash | 22-30% |
| Sodium Metasilicate | 4-9% |
| Sodium Tetraborate | 2-5% |
| Magnesium Oxide | 0.04-0.08% |
| Sulfonated Formaldehyde | 0.05-0.1% |
| Protein | 0.09-0.22% |
| Fumed Silica | 0.2-0.3% |
| 6 mm Glass Micro Fibers | 0.03-0.25% |
| Water | 22-35%. |

30. A process for protecting a building against fire by a process that comprises applying to at least a portion of said building a composition according to claim 1.

* * * * *